United States Patent [19]

Nagashima et al.

[11] Patent Number: 4,483,072
[45] Date of Patent: Nov. 20, 1984

[54] MACHINE WITH LIQUID CRYSTAL DISPLAY

[75] Inventors: Akira Nagashima, Kawasaki; Tadashige Kondo, Tokyo, both of Japan

[73] Assignee: Kioritz Corporation, Tokyo, Japan

[21] Appl. No.: 425,823

[22] Filed: Sep. 28, 1982

[30] Foreign Application Priority Data

Jul. 27, 1982 [JP] Japan ............... 57-112860

[51] Int. Cl.³ .............................. B27B 17/00
[52] U.S. Cl. ..................... 30/381; 40/448; 83/522
[58] Field of Search .......... 30/381, 382; 29/407, 29/595; 83/522; 40/448

[56] References Cited

U.S. PATENT DOCUMENTS 4,219,932  9/1980  Nagashima et al. ............ 30/381
4,231,034 10/1980  Bechteler ....................... 40/448

Primary Examiner—Jimmy C. Peters
Attorney, Agent, or Firm—Karl W. Flocks; A. Fred Starobin; Sheridan Neimark

[57] ABSTRACT

A power-driven portable machine such as a chain saw. The machine has a liquid crystal display device incorporated in a detachable cover member of a supporting assembly which is connected with a driving assembly including a prime mover such as internal combustion engine through vibration damping members.

4 Claims, 3 Drawing Figures

MACHINE WITH LIQUID CRYSTAL DISPLAY

BACKGROUND OF THE INVENTION

The present invention relates to a power-driven portable machine such as chain saw and, more particularly, to a power-driven portable machine which requires an observation of state of operation of the machine.

Hitherto, the evaluation or judgement of the condition or state of operation of power-driven portable machine such as chain saw has been made relying upon the knowledge and experience of the operator. However, in order to fully enjoy the performance of the machine while making most of the operator's ability and ensuring the safety of the work, it is desirable that the condition or state of operation such as revolution speed of the motor or internal combustion engine, amount of remaining fuel, lubricating condition or the like is observed continuously.

To cope with this demand, Japanese patent application No. 157,384/1977 proposes a power-driven portable machine having displaying means for permitting continuous observation of operating condition.

SUMMARY OF THE INVENTION

The present invention aims at providing an improved power-driven portable machine having displaying means for continuous observation of operating condition of the machine.

To this end, the invention provides a power-driven portable machine having a driving assembly including a prime mover and a supporting assembly including handles connected with the driving assembly through vibration damping members, the power-driven portable machine comprising a liquid crystal display device incorporated in a detachable cover member which constitutes a part of the supporting assembly.

According to the invention, therefore, it is possible to easily attach the display device not only in the assembling line, i.e. to the new machine but also to existing machines as an optional part. In the case of a trouble or failure in the display device, it can be renewed simply by replacing the cover member of the machine. It is thus possible to execute the work continuously and safely under a good operating condition.

Other objects, features and advantages of the invention will become clear from the following description of the preferred embodiment taken in conjunction with the accompanying drawings.

DESCRIPTION OF THE PREFERRED EMBODIMENT

The invention will be more fully understood from the following description of the preferred embodiment applied to a chain saw, with reference to the accompanying drawings.

Figure 1:
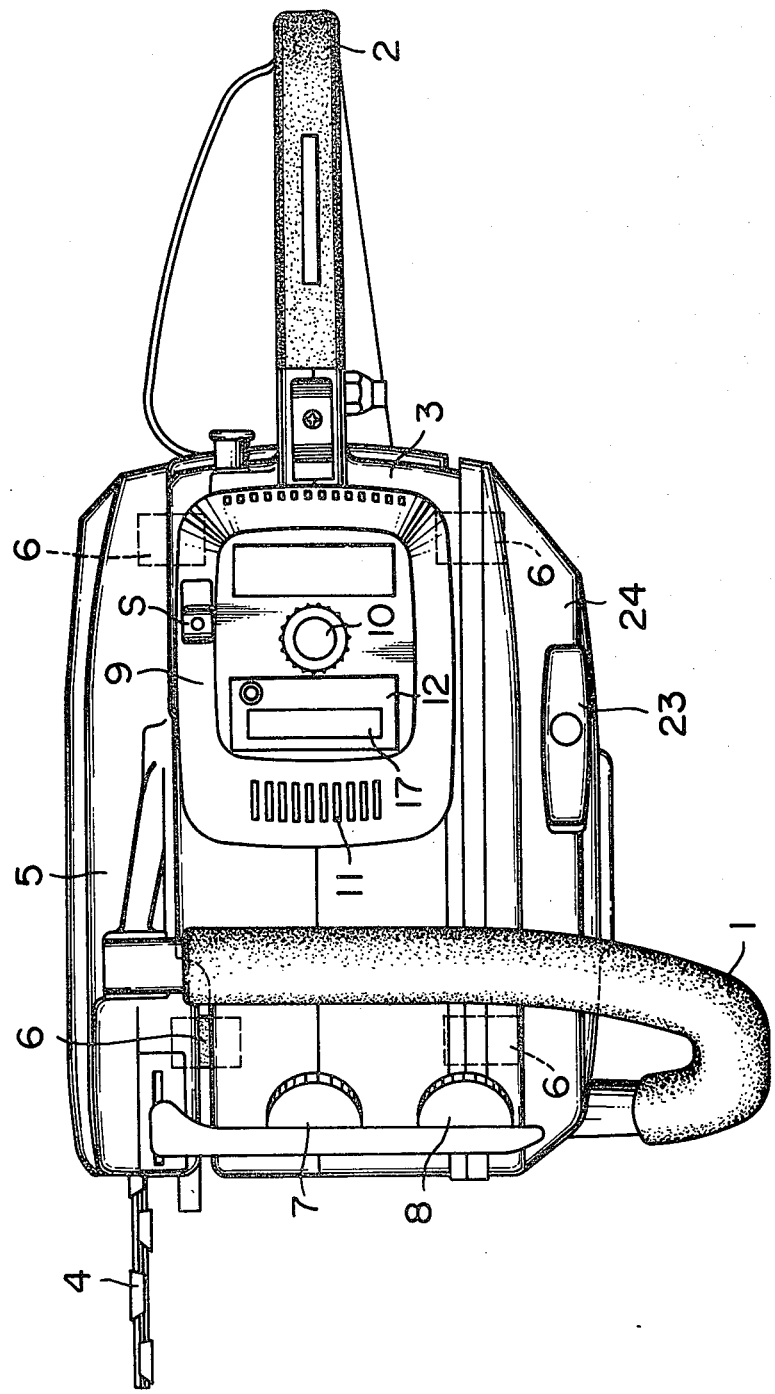
FIG. 1 is a plan view of a chain saw as an embodiment of the invention.
Figure 2:
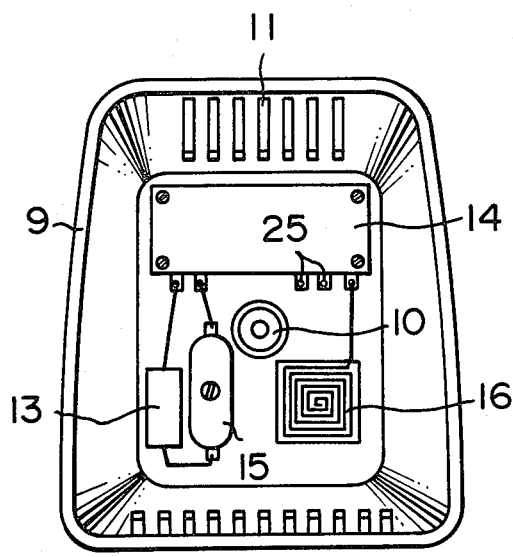
FIG. 2 is an enlarged bottom plan view of a cover.
Figure 3:
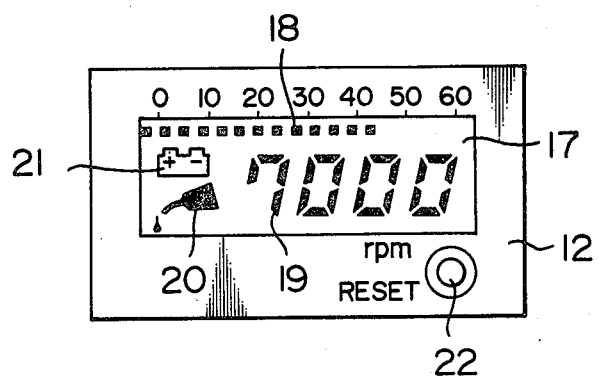
FIG. 3 is an enlarged view of a display device.

Referring to the drawings, a chain saw as a power-driven portable machine of the invention has a driving assembly 5 including an internal combustion engine (not shown) and a guide bar 4 along which a saw chain runs. The chain saw further has a supporting assembly 3 which includes a front handle 1, a rear handle 2, a fuel tank 8 and a lubricating oil tank 7 containing a lubricating oil for lubricating the saw chain. The handles 1, 2 and tanks 7, 8 are connected with the driving assembly 5 through the medium of vibration damping members 6, 6, 6, 6 such as of rubber. According to the invention, a liquid crystal type display device 12 is incorporated in, for example, a cover 9 of a carburetor chamber constituting a part of the supporting assembly 3. More specifically, this cover 9 is secured to the upper side of the carburetor chamber by means of fixing screw 10 through an air filter (not shown) and, hence, fixed to the supporting assembly 3. A reference numeral 11 designates an air suction opening to the carburetor chamber. A liquid crystal board 17 and a power source switch S are mounted on the cover 9 to appear to the outside therefrom, while the body of the display device 12 is attached to the lower side of the cover 9 facing the carburetor chamber. The body of the display device 12 includes an electronic circuit 14, battery package 15 as an independent power supply, power switch unit 13 and an antenna or pickup 16 of a contactless tachometer. In FIG. 2, a reference numeral 25 designates terminals for connecting sensors (not shown) which are disposed in the pipes for supplying fuel and lubricating oil. The liquid crystal board 17 exposed to the outside of the cover 9 has a function for displaying states of operation of the machine such as display 19 of the engine speed, display 18 of working hours, warning 20 for remaining fuel and lubricating oil, warning 21 for power of battery as the independent power source. A reference numeral 22 designates a reset button for the working hour display 18. The display device 12 may be installed on other parts than the described cover 9 of the carburetor chamber, e.g. the cover 24 of a recoil starter.

Before turning to the daily work, the operator turns the power switch S on so that the engine speed display 19 of the display device 12 starts the continuous display of the engine speed. As the engine speed is increased beyond a speed, e.g. 4,000 r.p.m. at which the centrifugal clutch connects the engine to the saw chain sprocket, the working hour display 18 is turned on to accumulate the actual working hour of the chain saw. During operation, the warning 20 of remaining fuel and lubricating oil informs any shortage of fuel or lubricating oil. It is also possible to know the exhaustion of the battery as the independent power source through the warning 21 of the battery power.

If the timing of fuel supply is estimated from the working hour through the working hour display 18, the operator can refuel the machine when a predetermined working hour is reached. In such a case, the operator may reset the working hour display 18 to zero by pressing the reset button 22, so that he can known the timing of next refueling from the working hour display 18. After finishing the daily work, the operator turns the power switch off to save the power of battery.

Although the invention has been described through specific terms, it is to be noted here that the described embodiment is not exclusive and various changes and modifications may be imparted thereto without departing from the scope of the invention which is limited solely by the appended claims.

What is claimed is:

1. A power-driven portable machine comprising
   a driving assembly including
      a prime mover;

a supporting assembly including
 handles,
 and a detachable cover mounted as part of said supporting assembly;
vibration damping members connecting said supporting assembly with said driving assembly;
said detachable cover including
 a liquid crystal display device including displays of working parameters,
 an electronic circuit means to produce the aforementioned displays of working parameters electrically connected to said liquid crystal display device,
 an independent power supply and power switch electrically connected to said electronic circuit means,
 reset means to reset at least one of said displays of working parameters connected to said electronic circuit means,
 antenna means to detect a working parameter information connected to transmit the working parameter information to said electronic circuit means for display on said liquid crystal display;
said liquid crystal display device, said electronic circuit means, said independent power supply and power switch, said reset means, and said antenna means all mounted in said detachable cover for separation with said detachable cover from the remaining part of said supporting assembly.

2. A power-driven portable machine according to claim 1, wherein said detachable cover is a cover of a carburetor chamber.

3. A power-driven portable machine according to claim 1, wherein said detachable cover is a cover of a recoil starter.

4. A power-driven portable machine according to claim 1, wherein said liquid crystal display device has a function to display at least one of the operation speed of said prime mover, working hour of said machine, warning of remaining fuel and lubricating oil and warning of power of battery.

* * * * *